US007748726B2

(12) United States Patent
Dudding et al.

(10) Patent No.: US 7,748,726 B2
(45) Date of Patent: Jul. 6, 2010

(54) LEADING AND TRAILING ARM SUSPENSIONS WITH Z-SHAPED ARMS

(75) Inventors: Ashley Thomas Dudding, Yorkville, IL (US); Jason Sleby Thomas, Elmhurst, IL (US); Rodolfo Rosales, Jr., Naperville, IL (US); Jerome Lim Cortez, Tinley Park, IL (US); Jerry Michael Lovett, Joliet, IL (US); Damon Elwood Dilworth, Channahon, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 11/734,671

(22) Filed: Apr. 12, 2007

(65) Prior Publication Data

US 2008/0252031 A1 Oct. 16, 2008

(51) Int. Cl.
*B60G 9/00* (2006.01)
(52) U.S. Cl. ............................................... 280/124.116
(58) Field of Classification Search ............ 280/124.11, 280/124.16, 124.117, 124.128, 124.13, 124.116
See application file for complete search history.

(56) References Cited

U.S. PATENT DOCUMENTS

| 6,032,967 | A * | 3/2000 | Ogoniek ............. 280/124.175 |
| 6,237,304 | B1 | 5/2001 | Wycech |
| 6,416,136 | B1 | 7/2002 | Smith |
| 6,491,314 | B2 | 12/2002 | Smith et al. |
| 6,508,482 | B2 | 1/2003 | Pierce et al. |
| 6,616,156 | B1 * | 9/2003 | Dudding et al. ........ 280/93.512 |
| 6,808,192 | B1 | 10/2004 | Bol |
| 7,131,652 | B2 | 11/2006 | Ramsey |
| 7,360,773 | B2 * | 4/2008 | Gottschalk ................. 280/86.5 |
| 7,360,774 | B2 | 4/2008 | Saieg et al. |
| 7,445,220 | B2 | 11/2008 | von Mayenburg et al. |
| 7,464,948 | B2 | 12/2008 | Ramsey |
| 7,484,745 | B2 | 2/2009 | Soles et al. |
| 2006/0244232 | A1 | 11/2006 | Cortez et al. |
| 2006/0244236 | A1 * | 11/2006 | Cortez et al. .......... 280/124.175 |
| 2008/0018070 | A1 * | 1/2008 | Gottschalk ................. 280/86.5 |
| 2008/0067771 | A1 | 3/2008 | Varela et al. |
| 2008/0238015 | A1 * | 10/2008 | Duddling et al. ...... 280/124.116 |

OTHER PUBLICATIONS

United States Patent and Trademark Office, Office Action dated Jun. 3, 2009 for U.S. Appl. No. 11/693,362.
International Search Authority, International Preliminary Report on Patentability for PCT/US08/58353 dated Oct. 13, 2009.
Notification of Transmittal of the International Search Report and the International Search Report for PCT/US08/58353 dated Jun. 9, 2009.
Written Opinion of the International Searching Authority for PCT/US08/58353 dated Jun. 9, 2009.

* cited by examiner

*Primary Examiner*—Faye M. Fleming
(74) *Attorney, Agent, or Firm*—Cook Alex Ltd.

(57) ABSTRACT

A leading or trailing arm vehicle suspension system comprised of a fabricated vehicle axle and an arm assembly. The arm assembly includes an axle bracket attached to the axle and a leading or trailing arm attached to the axle bracket. The arm provides bending stiffness to control axle windup and longitudinal stiffness to control axle position is disclosed. The axle bracket is attached to the vehicle axle with a through-bolt connection. The axle bracket or the arm includes rack and pinion mounting attachment holes and also includes other built-in features providing efficient transfer of loads into the vehicle axle.

33 Claims, 11 Drawing Sheets

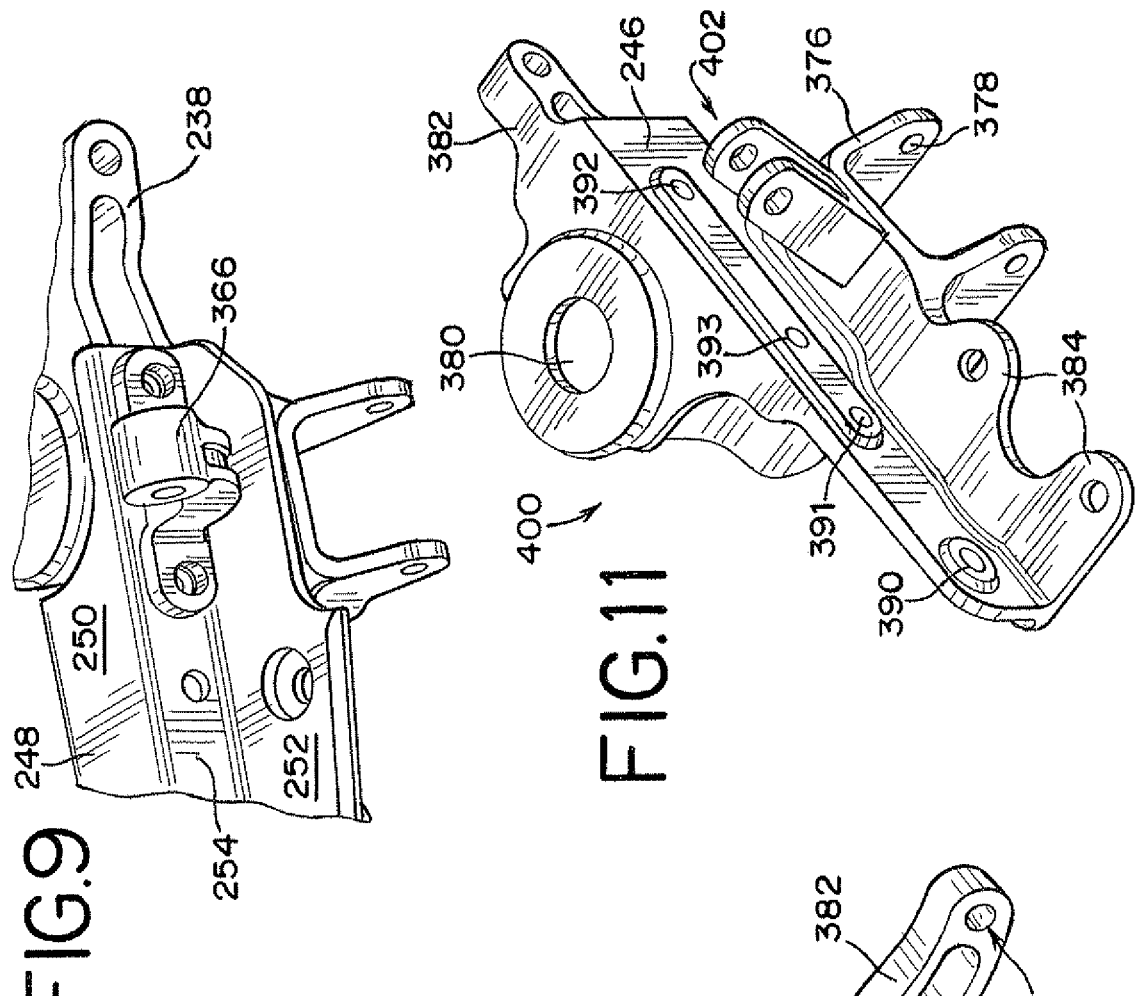
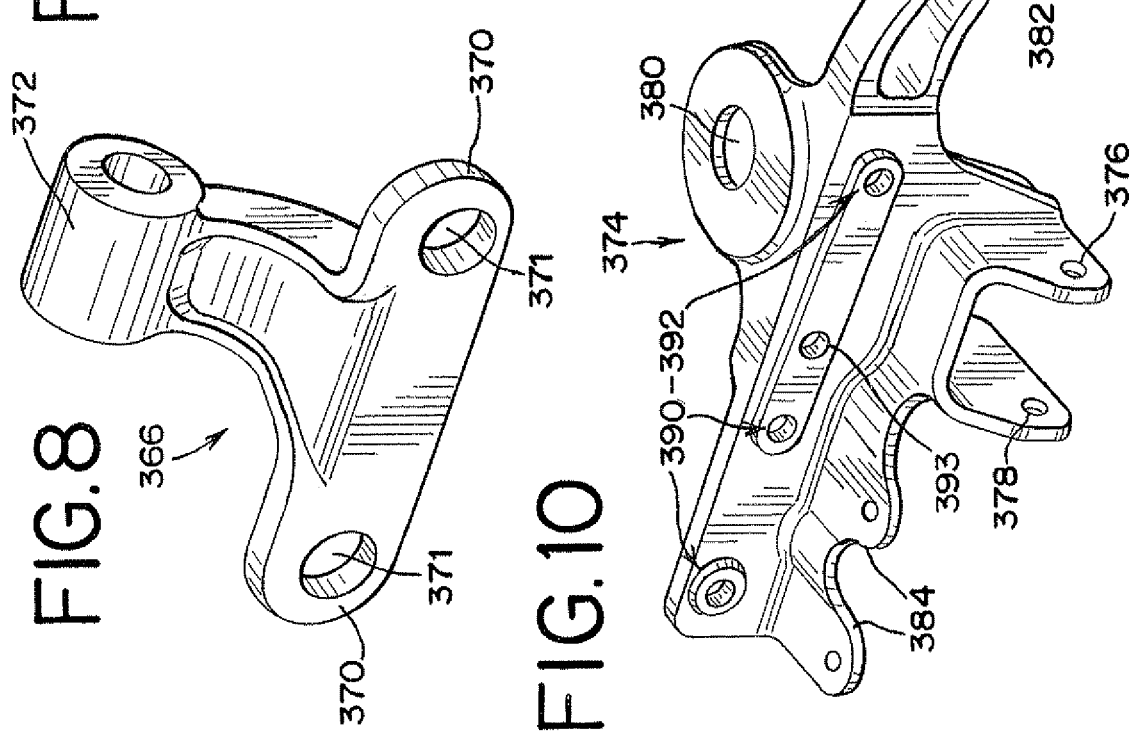

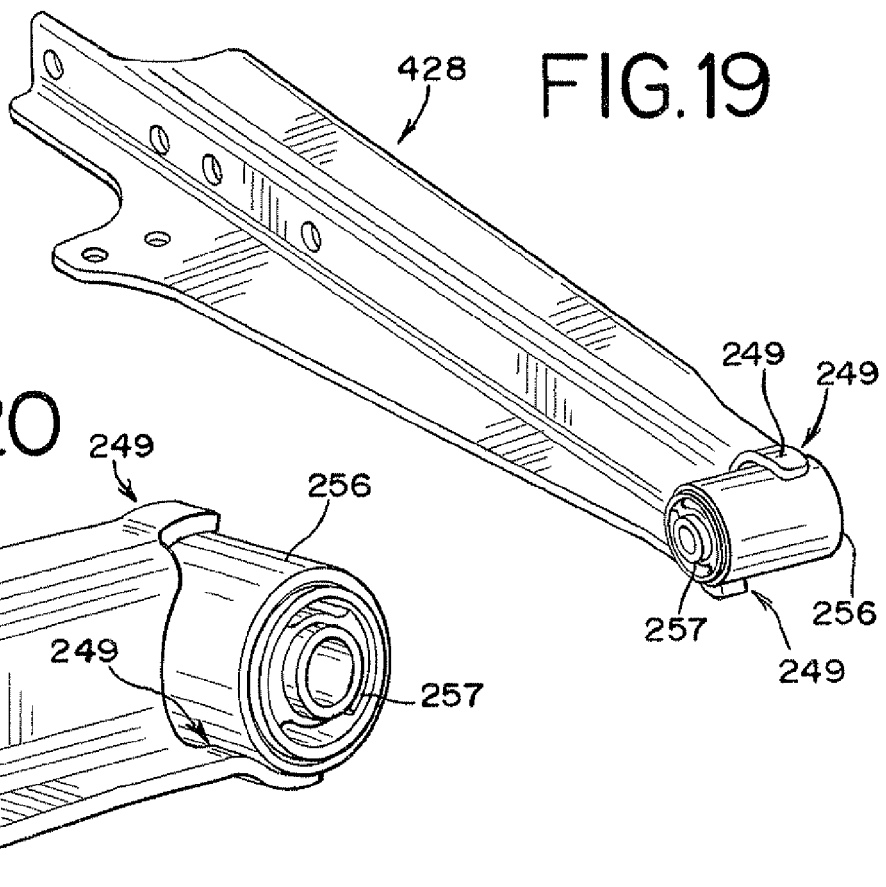
FIG.19
FIG.20
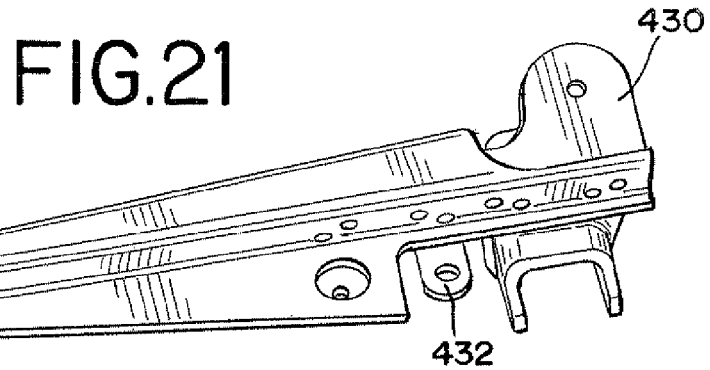
FIG.21
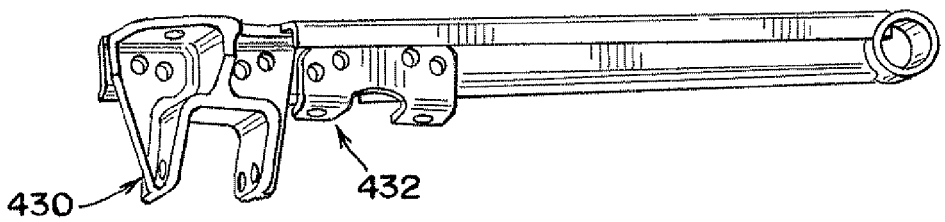
FIG.22

LEADING AND TRAILING ARM SUSPENSIONS WITH Z-SHAPED ARMS

BACKGROUND OF THE INVENTION

The present invention is generally directed to leading arm and trailing arm vehicle suspension system types. More specifically, the present invention is directed to suspension systems having a longitudinally extending arm connecting a fabricated hollow vehicle axle to a vehicle frame hanger.

Leading and trailing arm vehicle suspension systems are known. Such suspensions typically have a longitudinally extending arm that is pivotally connected at a proximal end to a vehicle frame hanger and generally rigidly connected at a distal end to a vehicle axle, typically through an axle seat or other intermediate suspension component. The arm typically provides a bending stiffness to control axle windup and longitudinal stiffness to control axle position. As used herein, the term arm shall be construed to exhibit the characteristics expressed within this paragraph.

Leading arm vehicle suspension systems are those types of suspensions wherein the vehicle axle is positioned forward of the frame hanger. Trailing arm vehicle suspension systems are those types of suspensions wherein the vehicle axle is positioned rearward of the frame hanger.

Leading arm vehicle suspension systems are illustrated in this patent application, for purposes of providing a frame of reference with regard to the direction and for purposes of uniformity. However, those skilled in the art will understand that the principles of the present invention are applicable to trailing arm vehicle suspension systems, as well. Therefore, for each example, each description of a leading arm vehicle suspension system shall be considered to be a description of and shall also apply to a trailing arm vehicle suspension system exhibiting similar structural and functional characteristics.

While prior leading and trailing arm vehicle suspension systems have been adequate for certain purposes, they have lacked some of the advantages obtainable with the embodiments of the present invention. Many of these advantages are clearly described herein and others shall be readily apparent to those skilled in the art.

One advantage achieved by the present invention is the use of a leading or trailing arm in a leading or trailing aim suspension system wherein the arm assembly includes an axle bracket attached to a tubular vehicle axle by, for example a durable through-bolt connection, and having a vertical plane permitting attachment thereto of a suspension component such as a trailing arm or leading arm of the type used in trailing arm suspension systems and leading arm suspension systems, respectively.

Another advantage achieved by the present invention is the use of such an axle bracket having a transverse torque rod attachment included in the axle bracket casting.

Another advantage achieved by the present invention is the use of such an axle bracket having shock attachment locations included in the axle bracket casting.

Another advantage achieved by the present invention is the use of such an axle bracket having rack and pinion attachment locations included in the axle bracket casting.

Another advantage achieved by the present invention is the use of such an axle bracket having air spring attachment locations included in the axle bracket casting.

Another advantage achieved by the present invention is the use of such an axle bracket having caster wedge attachment locations included in the axle bracket casting and further having slotted caster adjustment holes and a rounded pivot hole to permit assembly without a fixture.

A still further advantage achieved by the present invention is the use of an arm assembly with an arm having a Z-shaped cross-section fastened to the axle bracket along its vertical plane and thereby providing an efficient load transfer from the arm to the axle bracket casting to avoid or substantially reduce the development of stress risers around the fasteners used for such fastening and to produce optimal stress distribution.

Another advantage achieved by the present invention is use of such a z-shaped arm having its shear center in line with the attachment of the arm to the axle bracket casting thereby avoiding twisting and associated torsion in the part.

Another advantage achieved by the present invention is use of such a z-shaped arm with top and bottom flanges efficiently tapered to optimize the section for weight and to enhance compliance so the arm is not overly stiff during suspension roll.

Another advantage achieved by the present invention is use of voided bushings with such a z-shaped arm to further control roll stiffness within a predetermined favorable range.

Another advantage achieved by the present invention is the use of such a z-shaped arm having a transverse torque rod bracket connected thereto.

Another advantage achieved by the present invention is the use of such a z-shaped arm having rack and pinion attachment locations included in the beam.

Another advantage achieved by the present invention is the use of such a z-shaped arm having a stamped configuration to achieve ease of manufacture and to accommodate packaging limitations.

Another advantage achieved by the present invention is use of such an arm assembly to reduce suspension system weight, part count, assembly time and assembly complexity.

Another advantage achieved by the present invention is the use of such an arm assembly to reduce failure modes and improve product integrity.

Another advantage achieved by the present invention is the ability to tune roll stiffness of the suspension by optimizing the compliance of the arm and the bushings used to connect the beam to its associated vehicle frame hanger.

These and other advantages of the preferred forms of the invention will become apparent from the following description. It will be understood, however, that an apparatus could still appropriate the invention claimed herein without exhibiting each and every one of these advantages, including those gleaned from the following description. The appended claims, not any advantages recited or implied herein, define the subject matter of this invention. Any and all advantages are derived from the preferred forms of the invention, not necessarily the invention in general.

SUMMARY OF THE INVENTION

The present invention is directed to a trailing or leading arm vehicle suspension system. A vehicle axle extends laterally across a vehicle centerline. The vehicle axle has a hollow section. An axle bracket is attached to the vehicle axle, and in turn, an arm is attached to the axle bracket and extends generally longitudinally and transverse to the direction of the vehicle axle. The axle bracket is fit onto the axle and wraps partially around the axle. The axle bracket has a vertical mounting plane surface that permits the arm to mount thereto.

Other preferred aspects of the present invention are described with reference to the drawings.

BRIEF DESCRIPTION OF THE DRAWINGS

In the following detailed description, reference will frequently be made to the following drawings, in which like reference numerals refer to like components, and in which:

FIG. 8 is a rear perspective view of a component that may be used in a suspension system designed in accordance with the principles of the present invention;

FIG. 9 is a perspective view of a portion of a suspension system using the component shown in FIG. 8;

FIG. 10 is a perspective view of a component that may be used in a suspension system designed in accordance with the principles of the present invention;

FIG. 11 is a perspective view of a similar component as that shown in FIG. 10, with modifications;

FIG. 19 is a perspective view of preferred aspects of a component shown in FIGS. 6 and 7;

FIG. 20 is a partial perspective view of the component shown in FIG. 19;

FIG. 21 is a perspective view of an assembly of certain components that may be used with suspension systems constricted in accordance with the principles of the present invention; and FIG. 22 is another perspective view of assembly of certain components shown in FIG. 21.

DETAILED DESCRIPTION OF THE DRAWINGS

Figure 1:
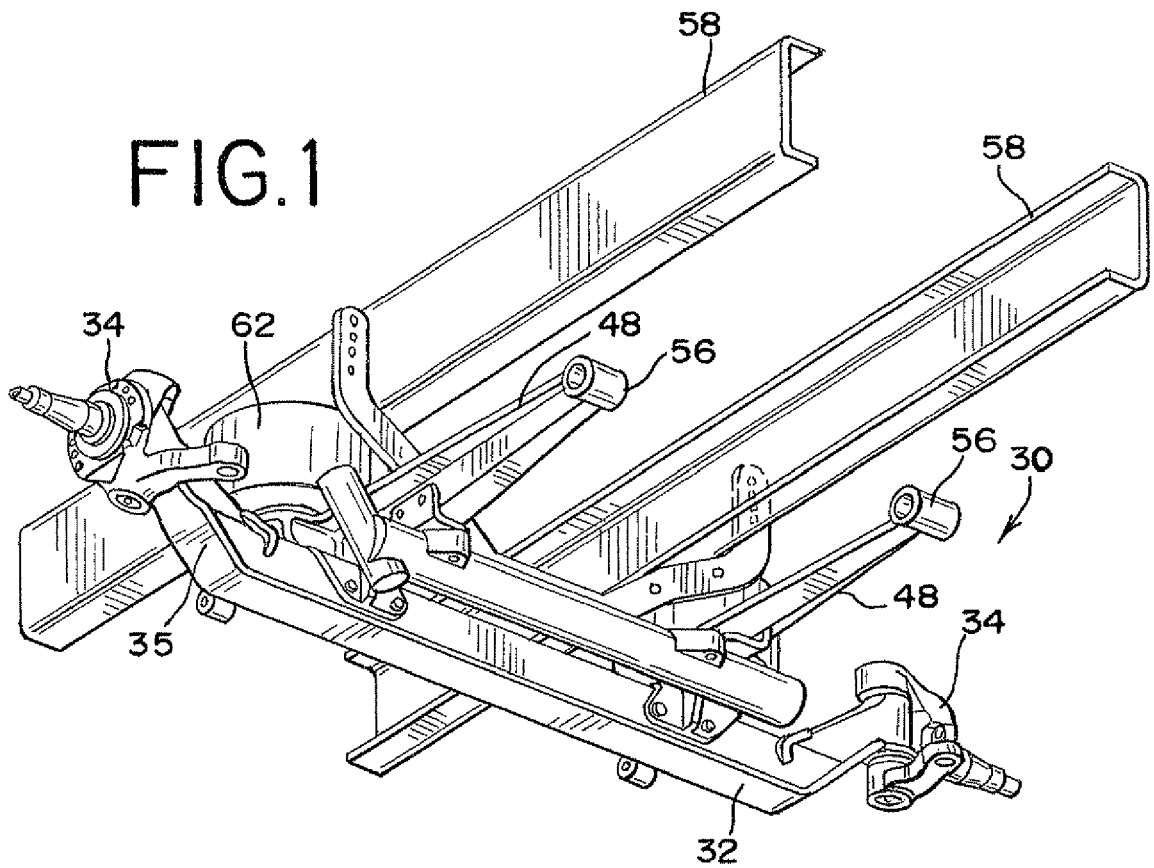
FIG. 1 is a rear perspective view of a leading arm suspension system constructed in accordance with the principles of the present invention.
Figure 2:
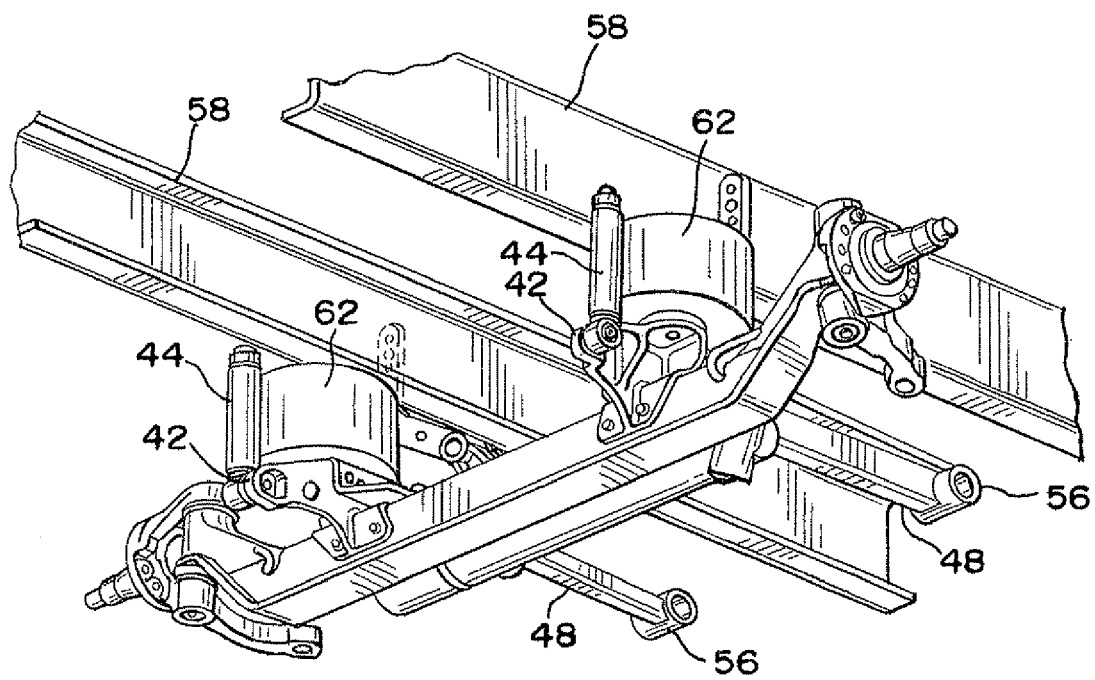
FIG. 2 is a front perspective view of the suspension system shown in FIG. 1.
Figure 3:
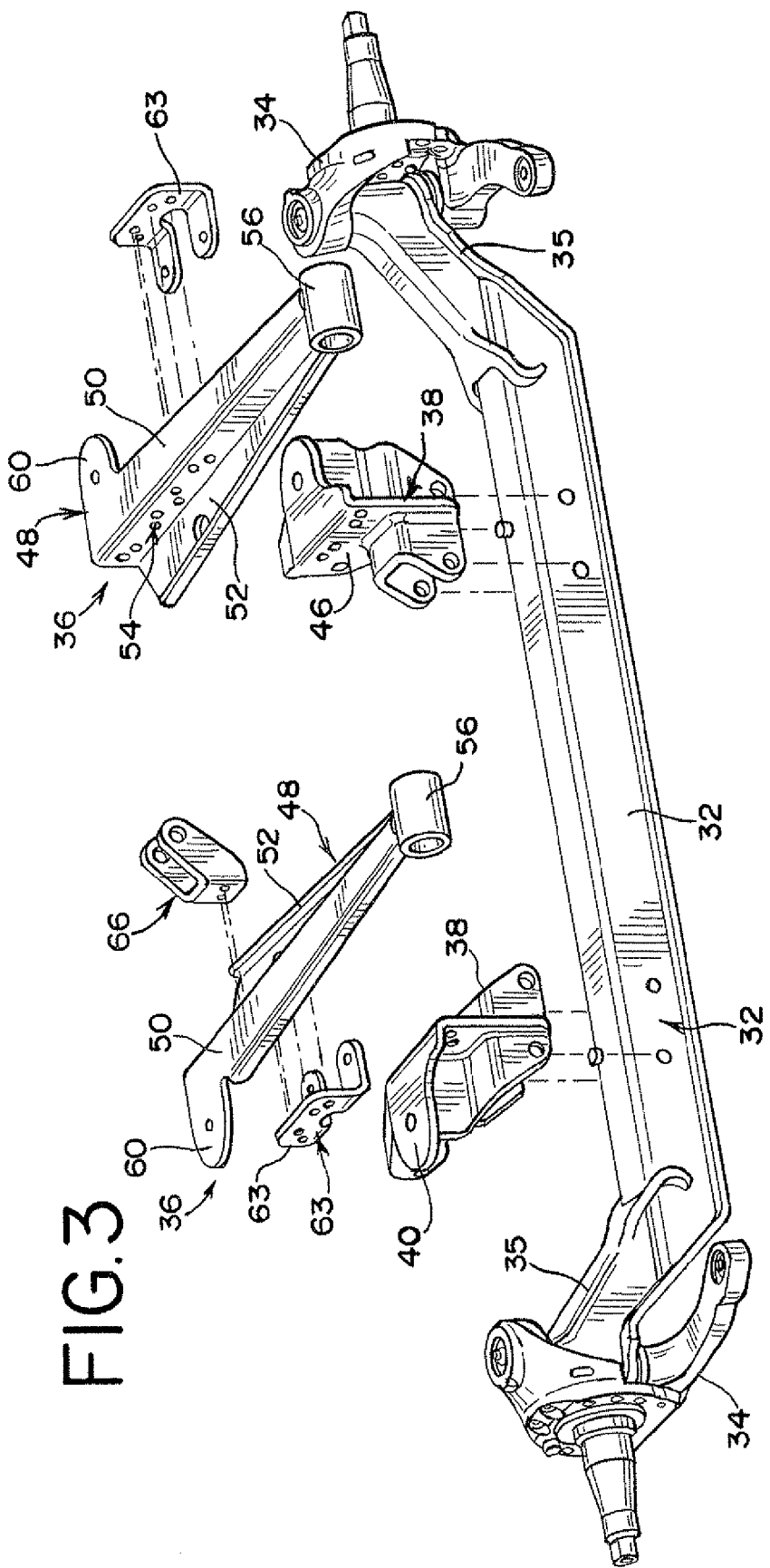
FIG. 3 is an exploded rear perspective view of certain components of the suspension system shown in FIG. 1.

FIGS. 1-3 illustrate certain vehicle components for a vehicle having a leading arm type suspension 30. A fabricated vehicle axle 32 is shown as extending generally laterally across the vehicle centerline from one side to the other. Attached on opposite ends of fabricated vehicle axle 32 is a pair of cooperating steering knuckles 34. Steering knuckles 34 are pivotally attached to the respective gooseneck ends 35 of fabricated vehicle axle 32 by king pins (not shown) in known manner. For further information concerning details regarding fabricated vehicle axle 32 and steering knuckles 34, the reader may review U.S. Pat. No. 6,609,764 (Dudding et al.) and U.S. Pat. No. 6,616,156 (Dudding et al.). Having been fully described in those two patent publications, the details of fabricated vehicle axle 32 and steering knuckles 34 are available to and known by those skilled in the art, and it is unnecessary to recite such details herein. Nonetheless, U.S. Pat. No. 6,609,764 (Dudding et al.) is hereby incorporated herein by reference. Similarly, U.S. Pat. No. 6,616,156 (Dudding) is hereby incorporated herein by reference. The fabricated vehicle axle 32 has a box section to provide high roll stability.

FIGS. 1-3 also illustrate two leading arm assemblies 36, each of which includes an axle bracket 38 fit onto and bolted through fabricated vehicle axle 32. Axle brackets 38 are preferably either aluminum or ductile iron castings and are fully integrated structures that glove over the fabricated vehicle axle 32. This construction is very efficient with regard to cost and weight, as well as ease of manufacture. A through-bolt connection may be used to attach each axle bracket 38 with fabricated vehicle axle 32 and is described below with reference to other figures of the drawing.

Each axle bracket 38 includes an air spring mounting pad 40 and a shock attachment 42. Each axle bracket 38 has a shock absorber 44 attached thereto, as shown. Moreover, each axle bracket 38 includes a vertically oriented arm attachment surface 46 that, in cross-section, generally extends in the z-axis relative to the longitudinal and lateral axes of the vehicle.

Each leading arm assembly 36 also includes a leading arm 48 having a generally z-shaped cross-section. As such, each z-shaped arm 48 has a top laterally extending surface 50, a bottom laterally extending surface 52, and a vertically extending mounting surface 54 joining the top and bottom laterally extending surfaces. Each z-shaped arm 48 is attached to its associated axle bracket 38 by fastening the vertically oriented arm attachment surface 46 of the axle bracket with the vertically extending mounting surface 54 of the z-shaped arm. In this regard, bores on each of vertical surfaces 46, 54 are brought into axial alignment with each other and bolts or other fasteners are used to attach the axle bracket 38 and the z-shaped arm 48. This configuration provides an efficient load transfer from the arm 48 to the axle bracket casting 38 to avoid or substantially reduce the development of stress risers around the fasteners used for such fastening and to produce optimal stress distribution. The use of the z-shaped arm 48 having its shear center in line with the vertically extending mounting surface 54 of the arm and the vertically oriented arm attachment surface 46 of the axle bracket 38 avoids twisting and associated torsion in the part. The top and bottom laterally extending surfaces 50, 52 of the z-shaped arm 48 may be efficiently tapered to optimize the section for weight and to enhance compliance so the am is not overly stiff during suspension roll. Additionally, the open z-shaped section provides torsional compliance so that the arm 48 is not overstressed during suspension roll or cross-articulation. In the illustrated embodiment, the bottom laterally extending surface 52 of each z-shaped arm 48 is positioned generally inboard with respect to the top laterally extending surface 50 for that arm.

Each arm 48 includes a bushing receiving bore or outer canister 56 at its proximal end for receiving a bushing and connecting the beam to a vehicle frame hanger (not shown). Each vehicle frame hanger is attached to a respective one of the longitudinally extending vehicle frame rails 58. Each arm 48 extends longitudinally forward in the leading configuration from the vehicle frame hanger to and beyond the fabricated vehicle axle 32 and is attached to its associated axle bracket 38 in the manner described above. Each z-shaped arm 48 also includes an air spring mounting pad surface 60 that is complementarily shaped with the air spring mounting pad 60 of its associated axle bracket 38. An air spring 62 is mounted atop the air spring mounting pad surface 60 of each z-shaped arm 48, as illustrated in FIG. 3. As each arm 48 extends, its width steadily decreases from a maximum width at or about the termination of its air spring mounting pad surface region 60 to a minimum width at the bushing outer canister 56. In this regard, the outermost longitudinally extending edges for each of the top and bottom surfaces 50, 52 are tapered. Those skilled in the art will understand that different dimensions for arms 48 may be used, as desired. Arms 48 provide a bending stiffness to control axle windup and longitudinal stiffness to control axle position.

Figure 4:
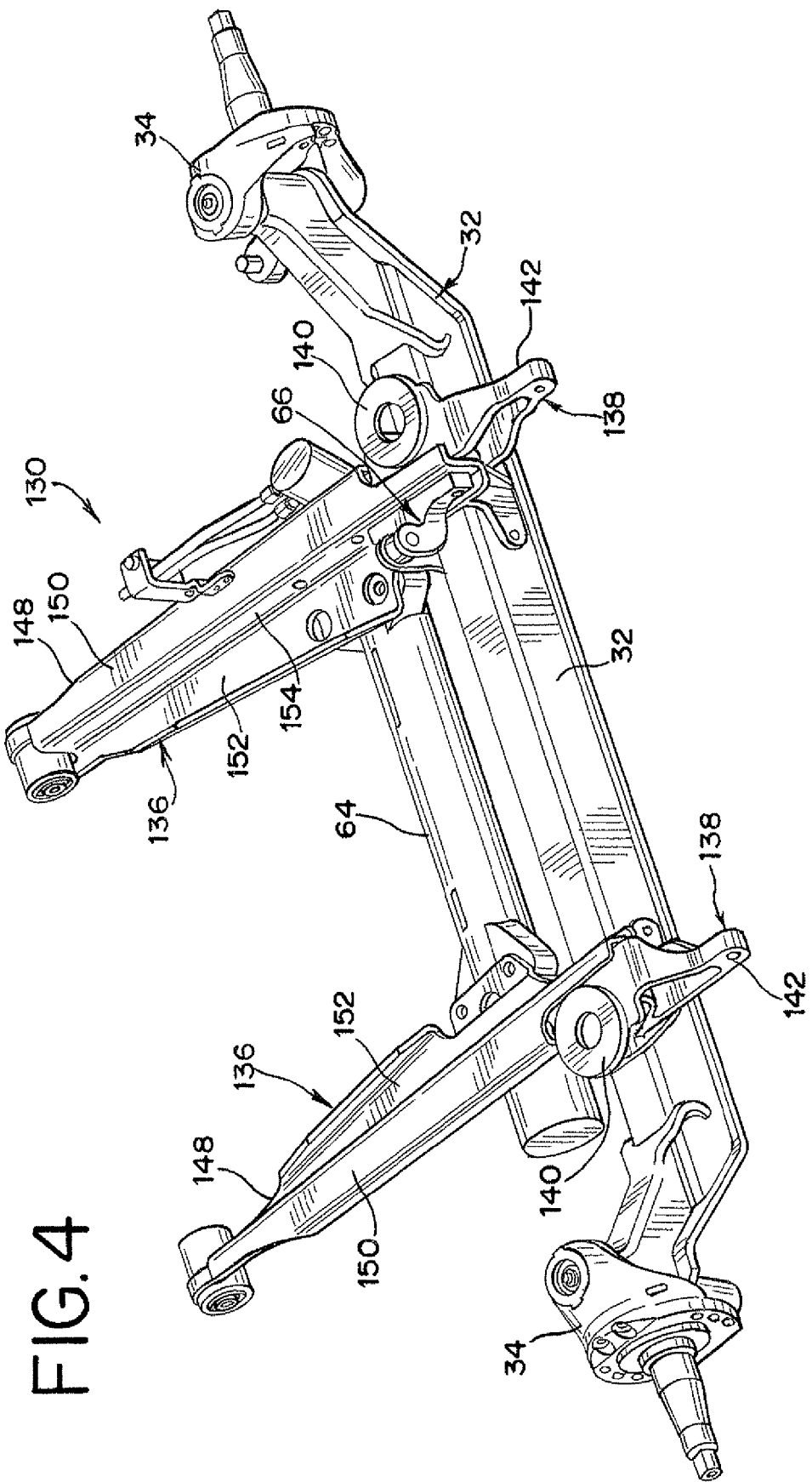
FIG. 4 is a front perspective view of certain components of another leading arm suspension system constructed in accordance with the principles of the present invention.

Each arm assembly 36 also includes a rack and pinion mounting bracket 63. Each such bracket 63 is fastened to the vertically extending mounting surface 54 of the arm 48, as shown. The rack and pinion mounting brackets 63 extend inboard and under the bottom surfaces 52 of the z-shaped arms 48. Referring to FIG. 4, a rack and pinion steering system 64 may then be mounted to mounting brackets 63 with appropriate fasteners.

One of the arm assemblies, in this illustrated case the right hand arm assembly, includes a transverse torque rod mounting bracket 66. Transverse torque rod mounting bracket 66 is also attached to the vertically extending mounting surface 54 of its associated arm 48; however, it is attached on the inboard side thereof and above the bottom extending surface 52 for that arm. When attached to the arm 48, the mounting bracket 66 is designed to receive and permit mounting of a transverse torque rod (not shown) by appropriate means.

Figure 5:
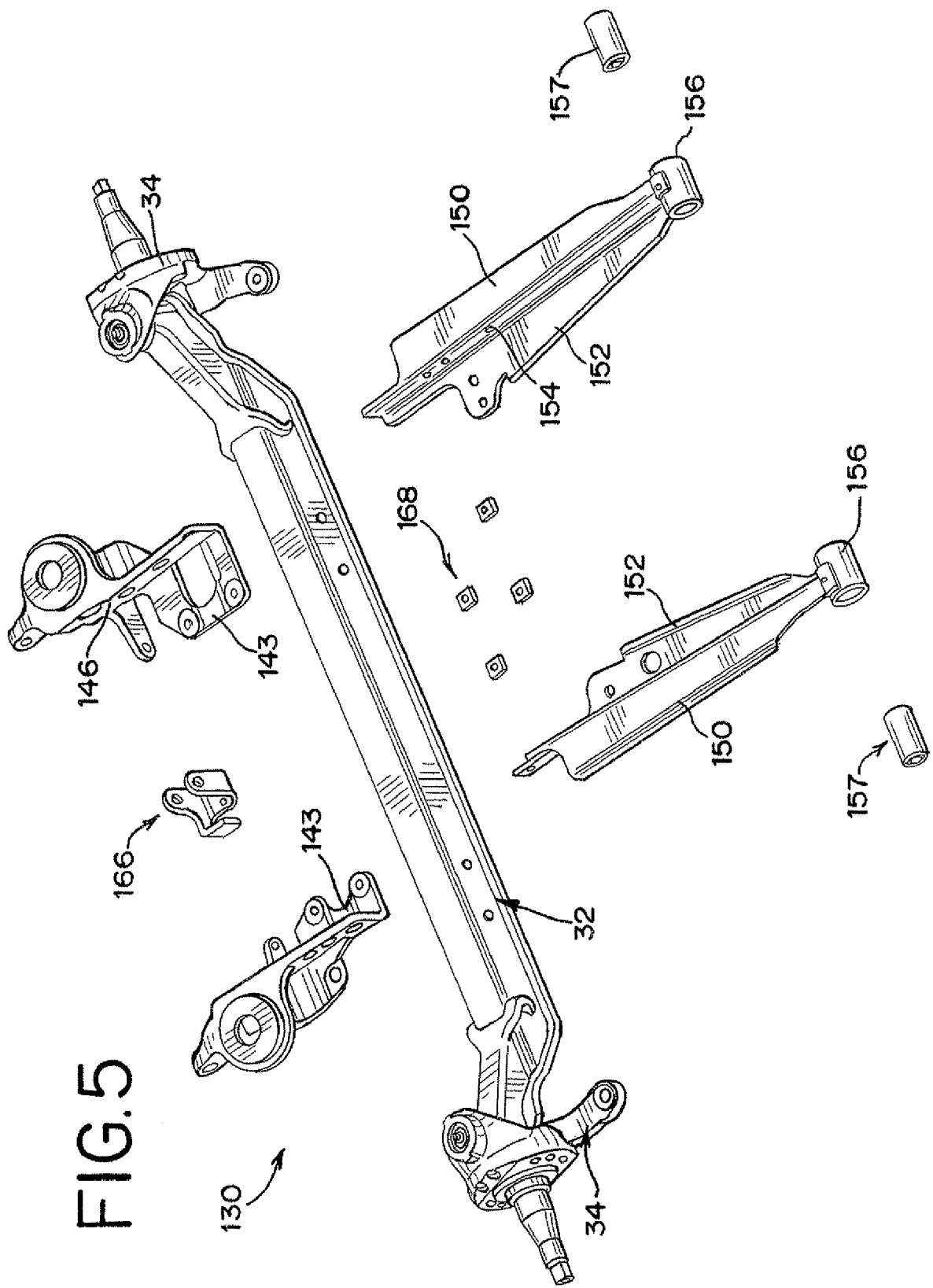
FIG. 5 is an exploded rear perspective view of the suspension system components shown in FIG. 4.

FIGS. 4 and 5 illustrate another leading arm suspension system 130. The vehicle includes a fabricated vehicle axle 32 and steering knuckles 34 of the types already described. Two arm assemblies 136 are also shown. Each arm assembly 136 includes an axle bracket 138 preferably made from an aluminum or ductile iron casting. Each axle bracket 138 is fit onto the fabricated vehicle axle 32 and attached thereto by a through-bolt connection as described later in this specification. Each axle bracket 138 includes an integrated air spring mounting pad 140, an integrated shock attachment 142 and an integrated rack and pinion attachment 143. Axle bracket 138 of this embodiment differs from axle bracket 38 of the embodiment illustrated in FIGS. 1-3 insofar as axle bracket 138 includes the integrated rack and pinion attachment 143. A rack and pinion steering system 64 is attached to the axle brackets 138, as shown in FIG. 4, by the use of appropriate fasteners. Air springs and shock absorbers are not shown in FIGS. 4 and 5; however, it will be appreciated that they are also attached to axle brackets 138 in a manner consistent with their attachment shown in the embodiment illustrated by FIGS. 1-3. It will be appreciated that while axle brackets 138 illustrated in this embodiment are different in configuration, they could be identical in other embodiments of the present invention.

A z-shaped arm 148 is included as part of each arm assembly 136. Z-shaped arms 148 have similar shapes and designs as the z-shaped arms 48 described in the prior embodiment. The two z-shaped arms 148 each have a generally z-shaped cross-section. Each z-shaped arm 148 has a top laterally extending surface 150, a bottom laterally extending surface 152, and a vertically extending mounting surface 154 joining the top and bottom laterally extending surfaces. Each z-shaped arm 148 is attached to its associated axle bracket 138 by fastening the vertically oriented arm attachment surface 146 of the axle bracket with the vertically extending mounting surface 154 of the z-shaped arm. Bores on each of vertical surfaces 146, 154 are brought into axial alignment with each other and bolts or other fasteners are used to attach the axle bracket 138 and the z-shaped arm 148. With this assembly, the corresponding described benefits are achieved.

Each arm 148 includes a bushing receiving bore or outer canister 156 at its proximal end for receiving a bushing 157 and connecting the arm to a vehicle frame hanger (not shown) and ultimately the longitudinally extending vehicle frame rails. As each arm 148 extends from its proximal end to its distal end, the width thereof generally increases from a minimum width at the bushing outer canister 156 to a maximum width closer to the distal end. The top and bottom surfaces 150, 152 for each arm 148 are tapered, as desired, and optimized for preferred stiffness of the structure. Again, a variety of z-shaped arm dimensions may be used, as desired, to tailor the arm to the specific application of use.

The right hand arm 148 includes a transverse torque rod mounting bracket 166. The bracket 166 is preferably a casting and is attached to the vertically extending mounting surface 154 of its associated arm 148, on the inboard side thereof and above the bottom extending surface 152 for that arm. When attached to the arm 148, the mounting bracket 166 is designed to receive and permit mounting of a transverse torque rod (not shown) by appropriate means.

Caster wedges 168 are positioned between the axle brackets 138 and the arms 148 on each side of the suspension 130. The wedges 168 are sandwiched and retained between the axle brackets 138 and the arms 148. As a result, the desired caster angle for the suspension 130 may be set without requiring use of an assembly fixture (see FIG. 13).

Figure 6:
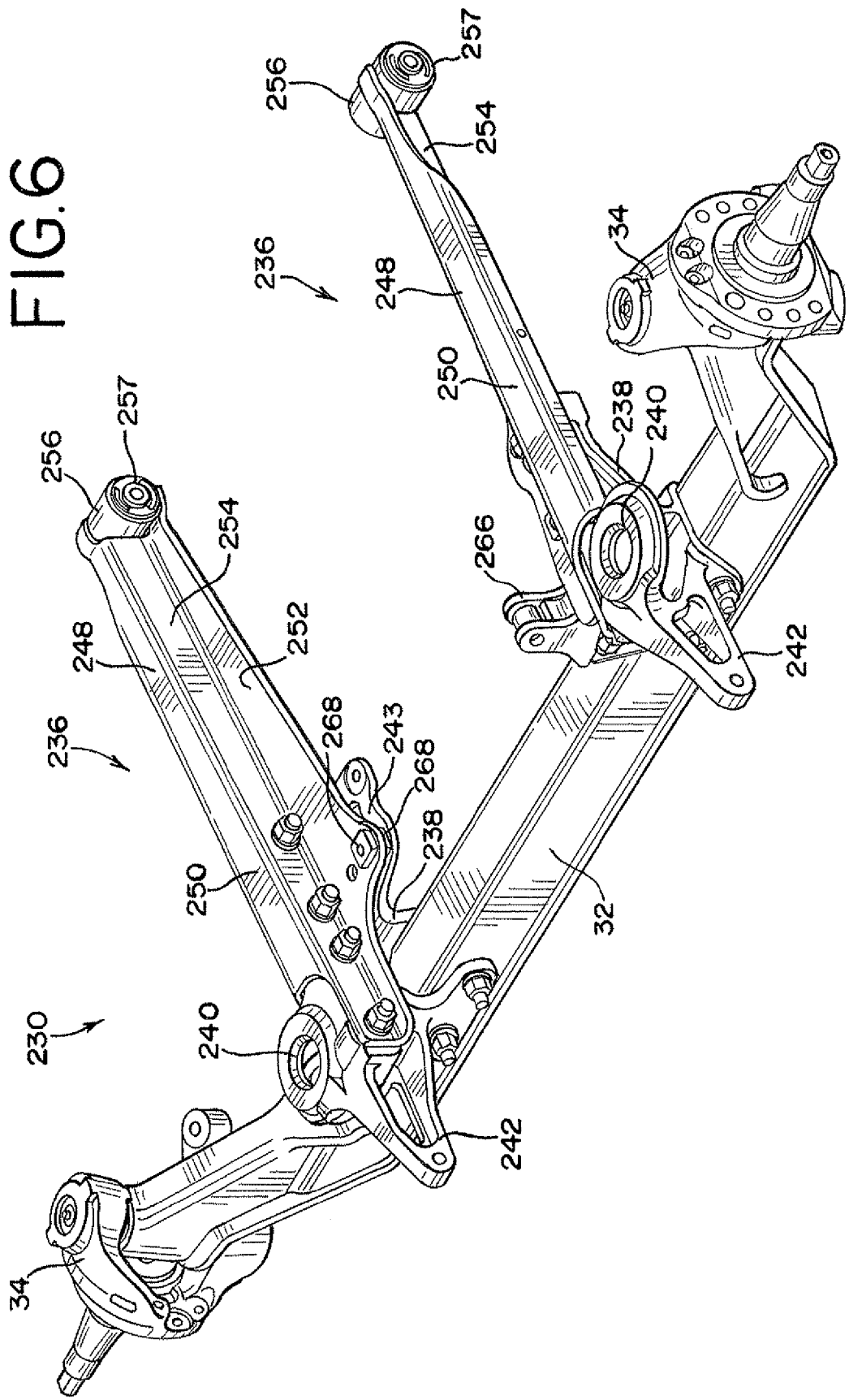
FIG. 6 is a front perspective view of certain components of a leading arm suspension system constructed in accordance with the principles of the present invention.
Figure 7:
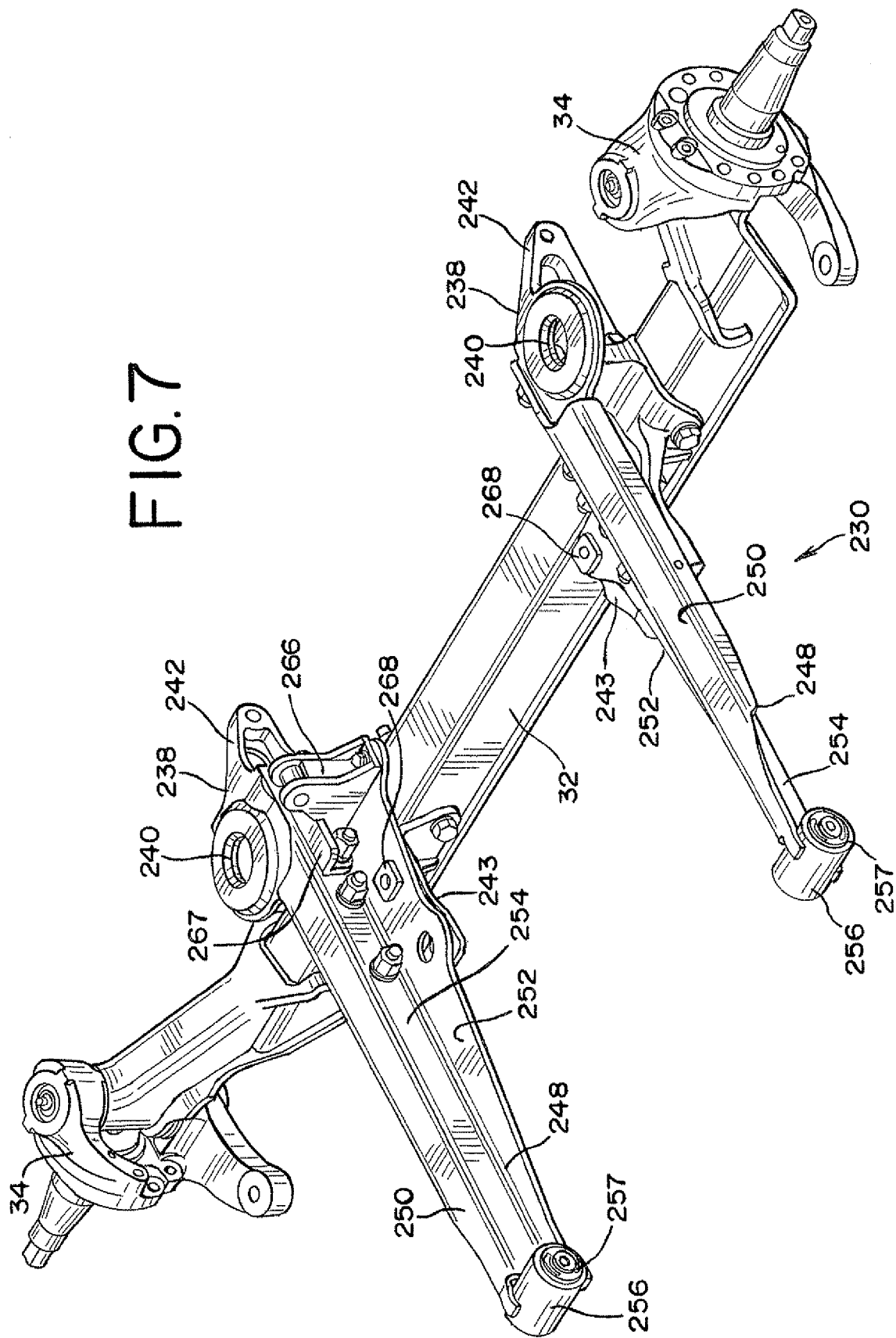
FIG. 7 is a rear perspective view of the suspension system components shown in FIG. 6.

FIGS. 6 and 7 illustrate yet another leading arm suspension system 230. The vehicle includes a fabricated vehicle axle 32 and steering knuckles 34 of the types already described. Again, two arm assemblies 236 are also present. Each arm assembly 236 includes an axle bracket 238 preferably made from an aluminum casting. Each axle bracket 238 is fit onto the fabricated vehicle axle 32 and attached thereto by a through-bolt connection. Each axle bracket 238 includes an integrated air spring mounting pad 240, an integrated shock attachment 242 and an integrated rack and pinion attachment 243. A rack and pinion steering system (not shown) is attached to the axle brackets 238 by fasteners. An air spring and a shock absorber (also not shown) are also attached to each of the axle brackets 238. The axle brackets 238 in this embodiment are different in configuration, but they could be identical.

A z-shaped arm 248 is included as part of each arm assembly 236. Z-shaped arms 248 have a similar z-shaped cross-section, producing the same benefits earlier described. In that regard, each z-shaped arm 248 has a top laterally extending surface 250, a bottom laterally extending surface 252, and a vertically extending mounting surface 254 joining the top and bottom laterally extending surfaces. The top and bottom laterally extending surfaces 250, 252 are tapered and slightly curved towards the horizontal center of the z-shaped cross-section to produce optimal stress properties.

Each z-shaped arm 248 is attached to its associated axle bracket 238 by fastening the vertically oriented arm attachment surface 246 of the axle bracket (see FIG. 13) with the vertically extending mounting surface 254 of the z-shaped arm. Bores on each of vertical surfaces 246, 254 are brought into axial alignment with each other and bolts or other fasteners are used to attach the axle bracket 238 and the z-shaped arm 248.

Each arm 248 includes a bushing receiving bore or outer canister 256 at its proximal end for receiving a bushing 257 and connecting the beam 248 to a vehicle frame hanger (not shown) and ultimately the longitudinally extending vehicle frame rails. As each arm 248 extends from its proximal end to its distal end, its width generally increases from a minimum width at the bushing outer canister 256 to a maximum width closer to the distal end and at the attachment for the rack and pinion mounting region 243 for the axle bracket 238, where caster wedges 268 are used to set a fixed, desired caster angle for the suspension 230 and permit assembly without use of a fixture. A variety of z-shaped arm dimensions may be used, as desired, to tailor the am to the specific application of use.

The right hand arm 248 includes a transverse torque rod mounting bracket 266 fastened thereto. The bracket 266 is preferably a casting and is attached to the vertically extending mounting plane 254 and the bottom laterally extending surface 252 of its associated am 248 on the inboard side the arm assembly. A mounting plate 267 permits attachment to the vertically extending mounting plane 254 of the arm 248 (see also FIG. 12). Some of the same fasteners used to attach the arm 248 with the axle bracket 238 may be used to attach the transverse torque rod mounting bracket 266 to the vertically extending mounting plane 254 of the arm. The mounting bracket 266 is designed to receive and permit mounting of a transverse torque rod (not shown) by appropriate means.

In all of the aforementioned embodiments, the same or similar components could be used for a trailing arm vehicle suspension system.

FIGS. 8 and 9 illustrate a transverse torque rod mounting bracket 366 shown in the form of an iron casting. The bracket 366 includes two mounting ears 370 having mounting bores 371 and is mounted to the inboard side of the vertically extending mounting flange 254 of the z-shaped arm 248 which in turn is mounted to the vertically oriented arm attachment plane 246 of the axle bracket 238. The bracket 366 also includes a torque rod attachment portion 372 for permitting attachment of a transverse torque rod (not shown).

FIG. 10 illustrates an axle bracket 374 shown in the form of an aluminum or ductile iron casting. The axle bracket 374 includes and axle through-bolt portion 376 designed to fit onto and permit a through-bolt connection with the vehicle axle 32. Bores 378 are included for this purpose. The axle bracket 374 also includes an air spring attachment portion 380, a shock absorber attachment portion 382 and a rack and pinion attachment portion 384, with appropriate bores permitting those components to be attached to the bracket. The axle bracket 374 further includes four bores 390-393 positioned along its vertically oriented arm attachment plane 394. Three bores 390-392 are slotted, while one bore 393 is round. The round bore 393 acts as a pivot or rotation point. The three slotted bores 390-392 permit fasteners to be positioned at a variety of positions along the slot. With this construction, the orientation between the axle bracket 374 and z-shaped arm can be adjusted, facilitating caster angle setting during assembly. This permits the assembly to be made without use of an assembly fixture.

FIG. 11 illustrates another axle bracket 400. This axle bracket 400 is similar to the one illustrated in FIG. 10, but it includes a transverse torque rod attachment 402 included within the axle bracket casting. This permits a transverse torque rod to be attached directly to the axle bracket 400 and results in a saving of weight, cost and component complexity.

FIGS. 12-15 illustrate portions of the suspension system components illustrated in FIGS. 6 and 7. Two shock attachment locations 242 are preferably used to permit a single axle bracket 238 to be used with vehicles having different desired specifications.

Caster wedges 268 may be used, as shown. Slotted bores 290-292 may rotate about a round pivot bore 293 to permit the desired caster angle to be set. A rack and pinion fastener 294 may be used to retain the caster wedges 268. Preferably, caster wedges 268 are retained above and below the bottom laterally extending surface 252 of the z-shaped arm 248 to permit the caster adjustment to be set and retained or locked at the desired setting. The orientation of the torque rod bracket 266 may then be varied, as desired.

Figure 12:
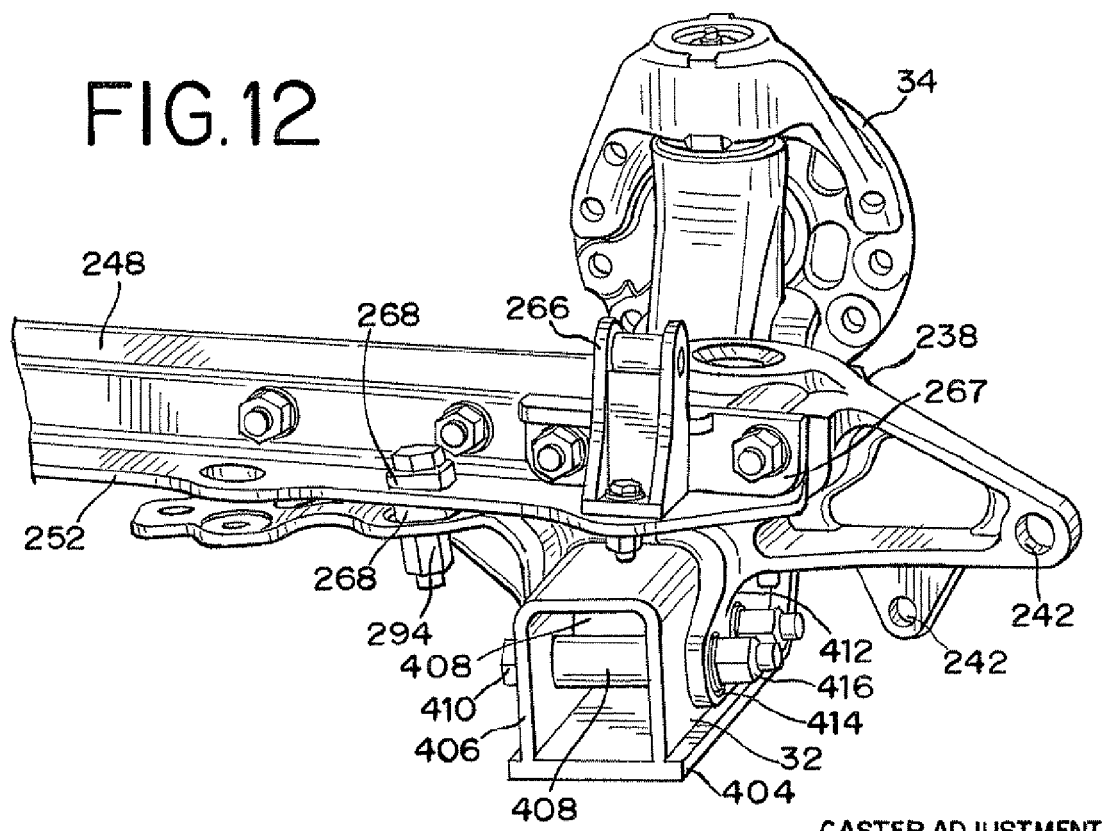
FIG. 12 is a perspective view of a portion of the leading arm suspension system components shown in FIGS. 6 and 7.
Figure 13:
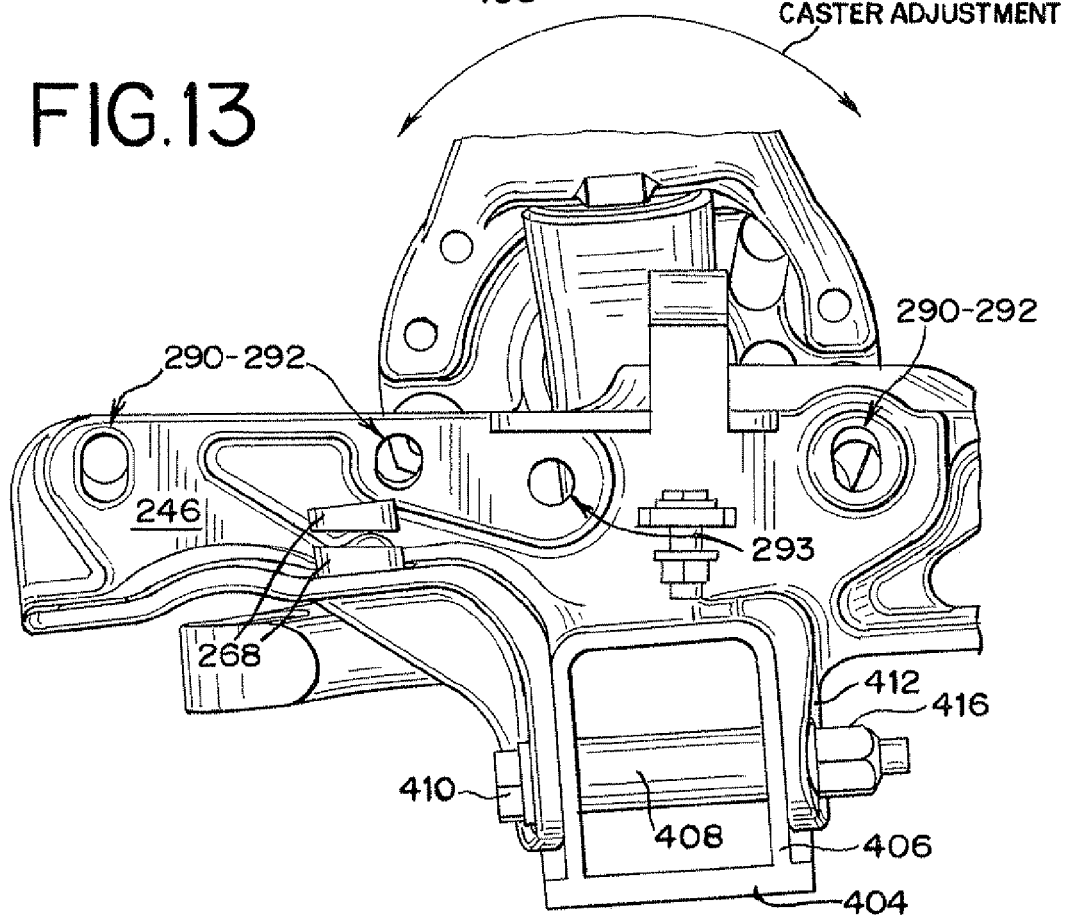
FIG. 13 is a sectional perspective view of the portion of the suspension system shown in FIG. 12.
Figure 14:
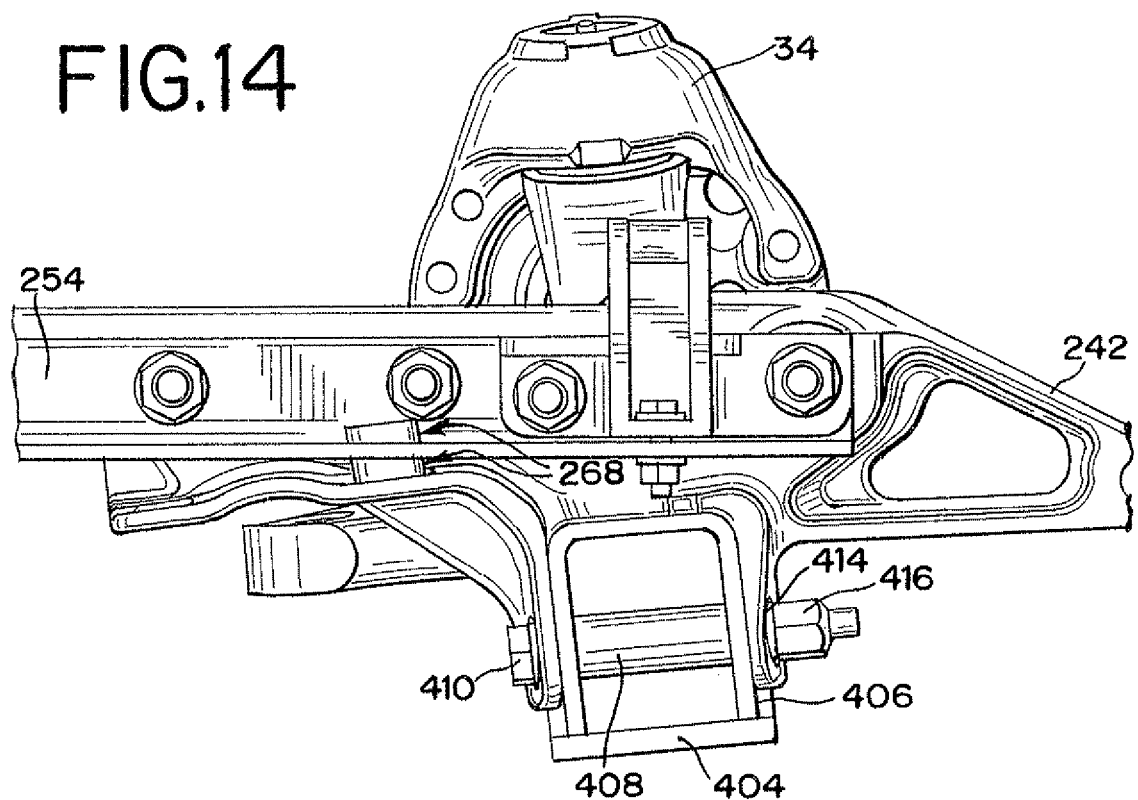
FIG. 14 is another sectional perspective view of the portion of the suspension system shown in FIG. 12.
Figure 15:
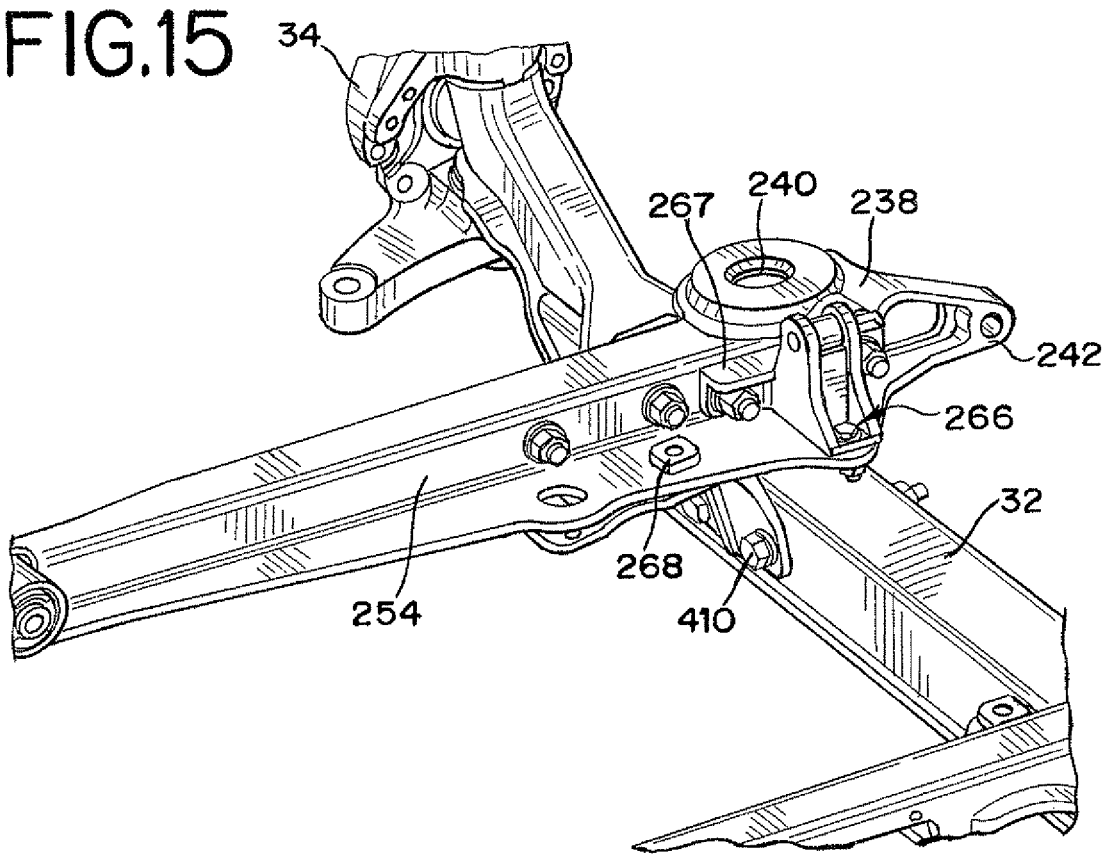
FIG. 15 is a perspective view of the assembly of the suspension system components shown in FIG. 12.

FIGS. 12-14 illustrate the through-bolt connection of the axle bracket 238 to fabricated vehicle axle 32. As shown, fabricated vehicle axle 32 includes the known bottom plate 404 having an inverted U-shaped member 406 welded thereto. Within the inverted U-shaped member 406, fabricated vehicle axle 32 includes sleeves 408 designed to accommodate the shafts of bolts 410 in a generally snug fitting relationship. As each axle bracket 238 wraps around the inverted U-shaped member 406 of fabricated vehicle axle 32, it includes a wrap plate 412 on the distal side of the axle. Wrap plate 412 includes two bores 414, which are brought into registration with the sleeves 408 extending through the inverted U-shaped member 406 of fabricated vehicle axle 32. The bolts 410 are inserted through bores machined into the bearing surfaces formed on the proximal end of the axle wrap portion of axle bracket 238, through sleeves 408, and through the bores 414 within wrap plate 412.

Figure 16:
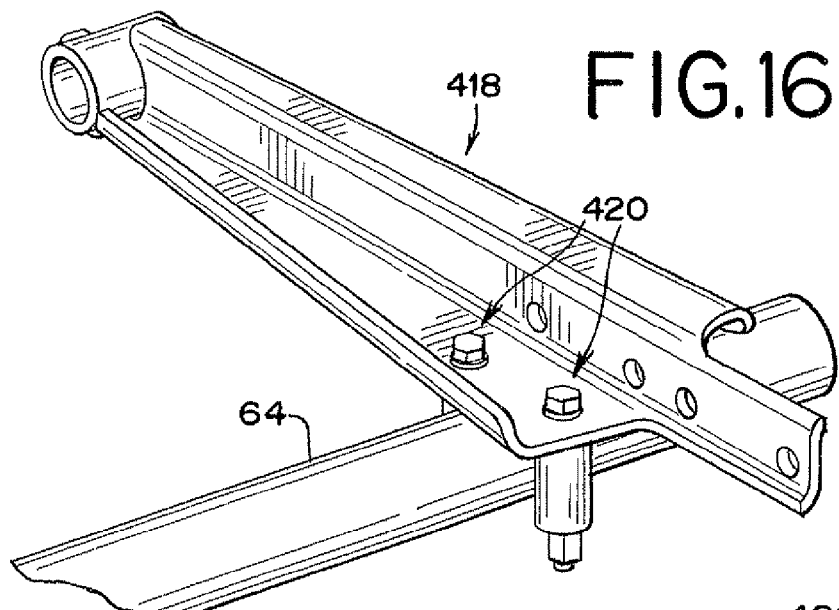
FIG. 16 is a perspective view of certain components that may be used with suspension systems constructed in accordance with the principles of the present invention.

FIG. 16 illustrates a z-shaped arm construction 418 having rack and pinion attachments 420 included therein. A rack and pinion steering system 64 is attached to the z-shaped arm 418. In the illustrated embodiment, the rack and pinion steering system 64 is attached by the use of fasteners securing the rack and pinion system to rack and pinion mounting holes incorporated into the arm 418.

Figure 17:
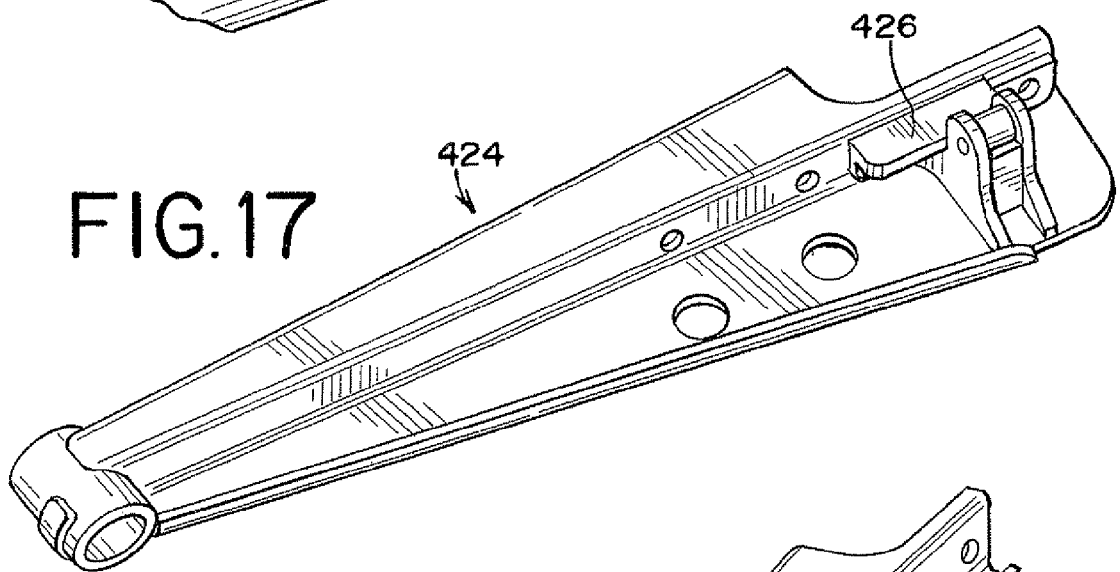
FIG. 17 is a perspective view of other certain components that may be used with suspension systems constructed in accordance with the principles of the present invention.

FIG. 17 illustrates a z-shaped arm 424 having a transverse torque rod bracket 426 welded thereto. This alternative means for attaching a torque rod bracket to the z-shaped arm may be used.

Figure 18:
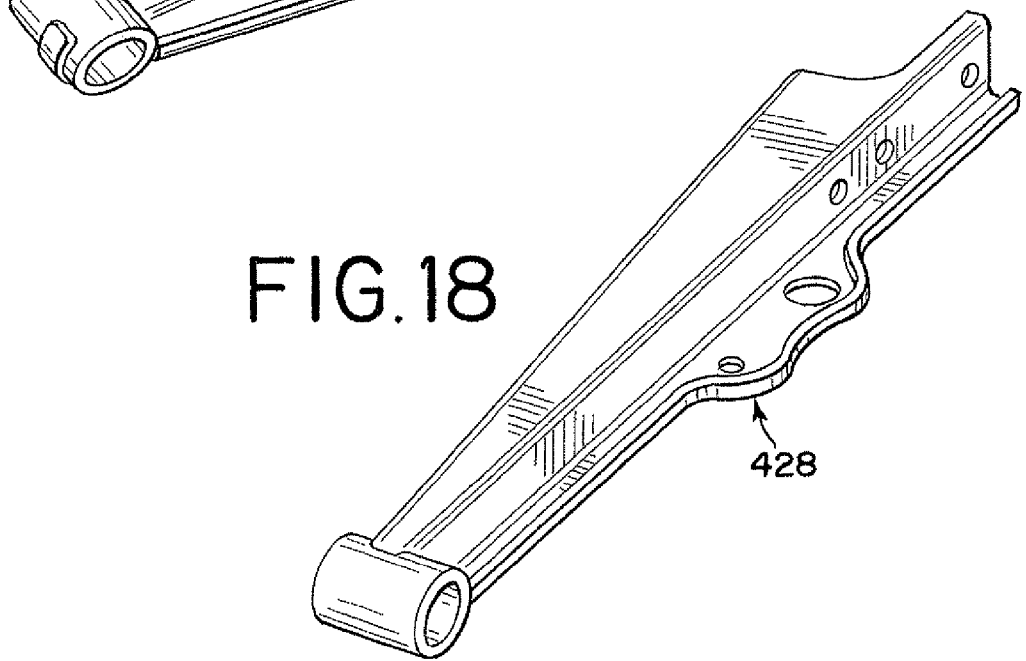
FIG. 18 is a perspective view of another component that may be used with suspension systems constructed in accordance with the principles of the present invention.

FIG. 18 illustrates a z-shaped arm having a stamped configuration. This construction permits the z-shaped arm 428 to have a variety of profiles, permitting even further optimizations of the part design to accommodate packaging limitations. The shape of the stamped z-shaped arm 428 may be tailored precisely for the intended use.

FIGS. 19 and 20 illustrate the z-shaped arm 428 having ski tip type weld contact surfaces 249 to permit the longitudinally extending portion of the z-shaped arm to have improved weld characteristics with the outer canister 256 for the bushing. In addition, a voided bushing 257 is shown with voids on the top and bottom to provide further control and tuning of roll stiffness. The fore-and-aft portion of the bushing 257 is not voided and is stiff to avoid potentially unfavorable behavior such as resonance in yaw. The roll stiffness for the suspension 230 is preferably within a range or "window." It is preferably high enough for desirable vehicle handling, yet low enough not to cause vibration and torsional inputs to the chassis and not to cause undue load transfer and understeer.

FIGS. 21 and 22 illustrate an alternative construction whereby separate brackets are used for the axle wrap and the rack and pinion steering system mounting. The axle wrap bracket is identified as reference numeral 430, and the rack and pinion mounting bracket is identified as reference numeral 432. Brackets 430, 432 are attached to the z-shaped arm by appropriate fasteners.

While this invention has been described with reference to several illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such chances and modifications would be recognized by those skilled in the art as an equivalent to one or more elements recited in the following claims, and shall be covered by such claims to the fullest extent permitted by law.

The invention claimed is:

1. An axle assembly for use in a vehicle, comprising:
a vehicle axle extending laterally across a vehicle centerline, said vehicle axle having a hollow section;
an axle bracket attached to the vehicle axle, said axle bracket being fit onto said axle and wrapping around at least part of said axle section;
said axle bracket further including a vertical suspension component attachment mounting surface positioned above said axle when said axle bracket is attached to said axle, and said vertical suspension component attachment mounting surface extends in a plane substantially perpendicular to said axle to provide a shear attachment mounting surface for a vertically extending mounting surface of an attached suspension component, wherein said attached suspension component has a z-shaped cross-section.

2. The axle assembly of claim 1 wherein the vehicle axle is a fabricated vehicle axle having a box section.

3. The axle assembly of claim 1 wherein said axle bracket is an aluminum casting.

4. The axle assembly of claim 1 wherein said axle bracket is an iron casting.

5. The axle assembly of claim 1 wherein said axle bracket includes a transverse torque rod attachment included as portion thereof.

6. The axle assembly of claim 1 wherein said axle bracket includes shock attachment included as a portion thereof.

7. The axle assembly of claim 1 wherein said axle bracket includes an air spring attachment as a portion thereof.

8. The axle assembly of claim 1 wherein said axle bracket includes a rack and pinion attachment as a portion thereof.

9. The axle assembly of claim 1 wherein said axle bracket includes a caster wedge attachment as a portion thereof.

10. The axle assembly of claim 9 wherein said axle bracket further includes slotted caster adjustment holes and a rounded pivot hole.

11. An axle assembly for use in a vehicle, comprising:
a vehicle axle extending laterally across a vehicle centerline, said vehicle axle having a hollow section;
an axle bracket attached to the vehicle axle, said axle bracket being fit onto said axle and wrapping around at least part of said axle section;
a suspension arm, separate from the axle bracket, attached to the axle bracket; and
a rack and pinion attachment bracket attached to the suspension arm.

12. The axle assembly of claim 11 wherein the vehicle axle is a fabricated vehicle axle having a box section.

13. The axle assembly of claim 11 wherein said axle bracket is an aluminum casting.

14. The axle assembly of claim 11 wherein said axle bracket is an iron casting.

15. The axle assembly of claim 11 wherein said axle bracket includes a transverse torque rod attachment included as portion thereof.

16. The axle assembly of claim 11 wherein said axle bracket includes shock attachment included as a portion thereof.

17. The axle assembly of claim 11 wherein said axle bracket includes an air spring attachment as a portion thereof.

18. The axle assembly of claim 11 wherein said axle bracket includes a caster wedge attachment as a portion thereof.

19. The axle assembly of claim 18 wherein said axle bracket further includes slotted caster adjustment holes and a rounded pivot hole.

20. A vehicle suspension system for attachment to a laterally extending vehicle axle, comprising:
an axle bracket attached to the vehicle axle, said axle bracket having a vertically oriented suspension, arm attachment mounting surface positioned above said axle when said axle bracket is attached to said axle, and said vertically oriented suspension arm attachment mounting surface extends in a plane substantially perpendicular to said axle; and
a longitudinally extending suspension arm attached to said axle bracket along said vertically oriented suspension arm attachment mounting surface of said axle bracket, said suspension arm having a vertically extending mounting surface that permits attachment of said vertically extending mounting surface of the suspension arm to said vertically oriented attachment surface of the axle bracket and wherein said suspension arm has a z-shaped cross-section.

21. The vehicle suspension of claim 20 wherein said suspension arm is a leading arm of a leading suspension system.

22. The vehicle suspension of claim 20 wherein said suspension arm is a trailing arm of a trailing suspension system.

23. An axle assembly for use in a vehicle, comprising:
a vehicle axle extending laterally across a vehicle centerline, said vehicle axle having a hollow section;
an axle bracket attached to the vehicle axle, said axle bracket being fit onto said axle and wrapping around at least part of said axle section;
a suspension arm attached to the axle bracket;
a rack and pinion attachment bracket attached to the suspension arm; and
wherein said suspension arm has a z-shaped cross-section.

24. The vehicle suspension of claim 20 further comprising a transverse torque rod bracket attached to said suspension arm.

25. The vehicle suspension of claim 20 wherein said suspension arm includes a rack and pinion attachment as a portion thereof.

26. The vehicle suspension of claim 20 wherein said axle bracket includes a caster wedge attachment as a portion thereof and further includes slotted caster adjustment holes and a rounded pivot hole.

27. The vehicle suspension of claim 20 wherein said suspension arm includes a bushing outer canister and a bushing inserted therein, and wherein said bushing is voided in two directions for controlling stiffness of the suspension.

28. The axle assembly of claim 1 wherein said suspension arm includes a top laterally extending surface, a bottom laterally extending surface and said vertically extending mounting surface joining the top laterally extending surface and the bottom laterally extending surface.

29. The axle assembly of claim 1 wherein a shear center of said suspension arm is in line with attachment of the suspension arm to the axle bracket.

30. The axle assembly of claim 28 wherein the top laterally extending surface and the bottom laterally extending surface are efficiently tapered to optimize the suspension arm for weight and to enhance compliance so the suspension arm is not overly stiff during suspension roll.

31. The vehicle suspension system of claim 20 wherein said suspension arm includes a top laterally extending surface, a bottom laterally extending surface and said vertically extending mounting surface joining the top laterally extending surface and the bottom laterally extending surface.

32. The vehicle suspension system of claim 20 wherein a shear center of said suspension arm is in line with attachment of the suspension arm to the axle bracket.

33. The vehicle suspension system of claim 31 wherein the top laterally extending surface and the bottom laterally extending surface are efficiently tapered to optimize the suspension arm for weight and to enhance compliance so the suspension arm is not overly stiff during suspension roll.

* * * * *